United States Patent [19]

Nordbrock et al.

[11] Patent Number: 4,517,507
[45] Date of Patent: May 14, 1985

[54] MULTIPLE OUTPUT ALTERNATOR SYSTEM

[75] Inventors: Raymond E. Nordbrock, West Chicago; Richard L. Spears, Union, both of Ill.

[73] Assignee: Motorola, Inc., Schaumburg, Ill.

[21] Appl. No.: 469,171

[22] Filed: Feb. 23, 1983

[51] Int. Cl.³ .............................................. H02J 7/14
[52] U.S. Cl. ...................................... 322/28; 307/16; 320/17; 320/61; 322/90
[58] Field of Search ................ 322/28, 94, 89, 90; 320/15–17, 64, 68, 61; 307/16

[56] References Cited

U.S. PATENT DOCUMENTS 3,922,592 11/1975 Quantz .............................. 322/90 X
4,041,363 8/1977 Scheider ........................... 320/17 X Primary Examiner—R. J. Hickey
Attorney, Agent, or Firm—Margaret Marsh Parker; John H. Moore; James W. Gillman

[57] ABSTRACT

A single alternator having multiple isolated windings provides multiple outputs as for charging 12 and 24 volt batteries. A main regulator controls the field coil current and a secondary regulator controls the charging current for the second battery by controlling the second rectifier.

4 Claims, 2 Drawing Figures 4,517,507

MULTIPLE OUTPUT ALTERNATOR SYSTEM

BACKGROUND OF THE INVENTION

This invention relates to the field of electrical supply systems as for vehicles and, more particularly, to systems for providing multiple output voltages with sufficient regulation on each output.

In many vehicles, particularly in trucks and heavy duty equipment, two different DC voltages are required with separately changing load levels. For example, a starter or cranking motor for such a vehicle may require a current of several hundred amperes at 24 volts for a brief period, then the 24 volt load drops sharply. Meanwhile, the alternator and a 12 volt battery will supply power for the accessories, and the ignition if so required.

Prior art solutions have included using two batteries with a series-parallel switch, creating a series connection for starting and a parallel connection for normal running operation. However, such a switch must be capable of carrying the heavy starting current, and the parallel connection is likely to have circulating currents which may cause serious problems. Another solution includes putting a tapped transformer between the alternator and the loads, but such a transformer will of necessity be heavy, bulky and expensive, not easily contained within the alternator housing. Another solution uses multiple isolated windings on an alternator with a relay having two pairs of contacts, one pair normally open and one pair normally closed. The relay coil is activated by an imbalance in the loads and switches the current to charge the batteries in series. However, none of these solutions has proven completely satisfactory, each having a problem with expensive and cumbersome structures and/or faulty regulation under widely varying load conditions.

SUMMARY

It is, therefore, an object of the present invention to provide a DC power source having at least two supply voltages.

It is a particular object to provide multiple voltages having satisfactory regulation under varying load conditions. It is another object to provide this type of supply without the addition of a second bulky and expensive component. These and other objects which will become apparent are obtained in a system wherein at least two isolated alternator windings are mounted on a stator, utilizing the same magnetic field. The field excitation is supplied by a field coil whose current is controlled by a standard regulator. One of the windings is rectified and supplies the main battery and the second winding is separately rectified and supplies a second battery, coupled in series with the main battery. A secondary regulator is coupled to control the second rectifier in response to the second battery voltage, thus preventing an overcharge of the second battery.

DETAILED DESCRIPTION OF THE PREFERRED EMBODIMENT

Figure 1:
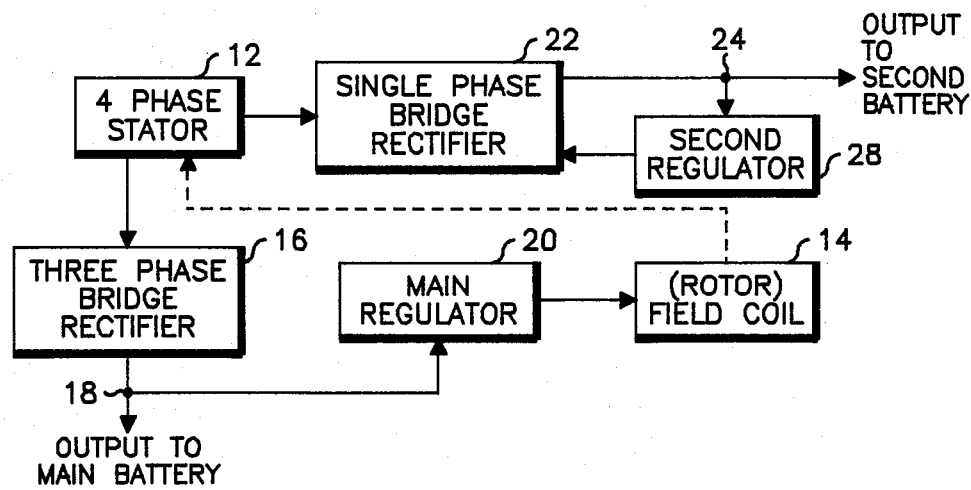
FIG. 1 is a block diagram of an entire charging system including the invention.

In FIG. 1, a four-phase alternator stator 12 is shown, with associated field coil 14. It is to be noted that, while an exemplary four-phase stator comprising one three-phase and one single-phase winding is shown in this embodiment, it is not intended that the invention be in any way limited thereto. It is only necessary that there be at least two isolated windings in whatever phase relationship is deemed necessary in the particular application. For the purposes of the invention, the source of the two AC currents need not even be an alternator, but must be controllable. A three-phase bridge rectifier 16 is coupled to a three-phase winding of the stator 12 for supplying a relatively constant 12 volt DC output to a terminal 18 of a main battery (not shown). Also coupled to the terminal 18 is a main regulator 20 which may be of any known type. The regulator 20 controls the current in the filed coil 14 which, in turn, controls the output of the stator windings.

Figure 2:
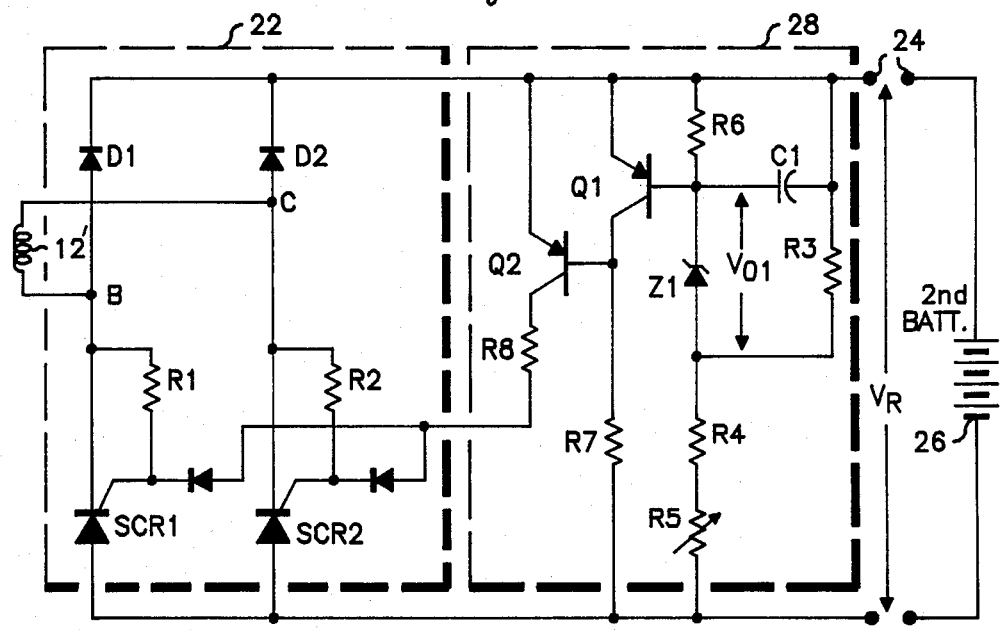
FIG. 2 is a schematic diagram of an embodiment of a portion of the system of FIG. 1.

The isolated single-phase winding of the four-phase stator is coupled to a single phase rectifier 22 whose output is coupled to a terminal 24 of a second battery 26 (FIG. 2). Also coupled to the terminal 24 is a second regulator 28 which will be further described with respect to FIG. 2. It will be apparent that the terminals 24 will, in actuality, be separated by either a diode or a switch such a portion of the ignition switch. The second regulator 28 is termed a "series" regulator since its effect is to regulate the current supplied to the second battery 26, and that current has already been regulated by the main regulator 20 via the field coil 14.

In FIG. 2, the single-phase winding, referenced here as 12', is coupled to the bridge rectifier 22 which comprises diodes D1, D2, SCR1, SCR2 and R1, R2. The rectifier 22 will supply charging current for the battery 26 when the SCR gates 1, 2 are activated.

The level of the regulated voltage $V_R$ determined by the voltage drop across a zener diode Z1 and the voltage divider comprised of resistors R3-5, R5 being an adjustment for different diodes Z1, but $V_R$ is also controlled by the charge on the battery 26. When $V_R$ is greater than the voltage of the battery 26; i.e., the battery should be charging, no current will flow through the zener diode Z1 and a transistor Q1 will not conduct. This will allow current to flow through the emitter-base diode of a transistor Q2 and a resistor R7 which is coupled to the base of the transistor Q2. Current also flows through transistor Q2 to resistor R8 and to SCR's 1 and 2, on alternate half cycles of the voltage from winding 12'. The two SCR's thus close, alternately, the DC path for battery charging current. When the battery voltage reaches the desired level, zener diode Z1 will break down, allowing current to flow through the emitter-base diode of transistor Q1 and the zener diode. Thus the collector of transistor Q1 and the base of transistor Q2 which is coupled to it approach the battery voltage. The transistor Q2 is now shut off and no gate current is supplied to SCR's 1 and 2 and they are cut off, preventing current flow in the battery circuit. In some applications, it may be desirable to have the voltage provided by winding 12' be high enough so that even if the main regulator 20 acting through the field coil 14 is calling for lowered voltage from the alternator stator 12, the second battery 26 will be maintained at full charge.

Thus there has been shown and described a complete system for providing multiple DC voltages such as 12/24 volts without the need for a separate transformer or heavy current switching relay. A second regulator which is effectively in series with the main regulator controls the bridge rectifier for a second winding on the alternator. Other variations and modifications of the present invention are possible and it is intended to cover all such as fall within the spirit and scope of the appended claims.

What is claimed is:

1. A multiple output alternator system for use with at least two series coupled loads and comprising:
   a source of alternating current, said source including a field winding, a three-phase winding and a second winding and supplying two electrically isolated output currents;
   a first output terminal for supplying direct current to a first one of said loads;
   a second output terminal for supplying direct current to a second one of said loads;
   a first rectifier coupled to receive and rectify a first one of said isolated output currents and to supply the rectified current to the first output terminal;
   a first regulator coupled to the first output terminal and to the alternating current source for controlling the source outputs in response to the voltage at the first output terminal;
   a second rectifier coupled to receive and rectify the second one of said isolated output currents and to supply the rectified current to the second output terminal; and
   a second regulator coupled to the second output terminal and to the second rectifier for controlling the second rectifier in response to the voltage at the second output terminal.

2. A multiple output alternator system according to claim 1 and wherein the second rectifier comprises a bridge arrangement of two diodes and two SCR's and wherein the second regulator control both SCR's.

3. A multiple output alternator system according to claim 2 and wherein the second regulator comprises a zener diode and a resistor coupled in a series across the second load, and transistor means coupled to be controlled by the zener diode and for supplying gate current to the SCR's.

4. A multiple output alternator system according to claim 3 and wherein each of said loads is a nominal 12 volt battery and the series combination makes 24 volts available.

* * * * *